(12) United States Patent
Bouvier et al.

(10) Patent No.: US 8,357,418 B2
(45) Date of Patent: Jan. 22, 2013

(54) METHOD FOR PREPARING CHOCOLATES AND/OR CHOCOLATE-/COCOA-FLAVORED COMPOSITIONS

(75) Inventors: Philippe Bouvier, Alicante (ES); Valentine Detalle, Versailles (FR)

(73) Assignee: Barry Callebaut AG, Zurich (CH)

( * ) Notice: Subject to any disclaimer, the term of this patent is extended or adjusted under 35 U.S.C. 154(b) by 328 days.

(21) Appl. No.: 12/439,741

(22) PCT Filed: Sep. 4, 2007

(86) PCT No.: PCT/FR2007/001432
§ 371 (c)(1),
(2), (4) Date: Dec. 1, 2009

(87) PCT Pub. No.: WO2008/029021
PCT Pub. Date: Mar. 13, 2008

(65) Prior Publication Data
US 2010/0138024 A1    Jun. 3, 2010

(30) Foreign Application Priority Data

Sep. 4, 2006    (EP) .................................... 06291395
Oct. 17, 2006   (CH) .................................... 1648/06

(51) Int. Cl.
*A23G 1/00* (2006.01)

(52) U.S. Cl. ........ 426/593; 426/481; 426/631; 426/660; 422/50; 422/68.1; 422/82.01; 436/43; 436/149; 436/173; 700/266; 700/268

(58) Field of Classification Search .................... 422/50, 422/68.1, 82.01; 436/43, 149, 173; 426/593, 426/481, 631, 660; 700/266, 268
See application file for complete search history.

(56) References Cited

U.S. PATENT DOCUMENTS

| | | | |
|---|---|---|---|
| 3,835,873 A | | 9/1974 | Wildpaner |
| 3,904,777 A | * | 9/1975 | Goerling et al. ............. 426/631 |
| 5,505,982 A | * | 4/1996 | Krawczyk et al. ........... 426/660 |
| 5,882,709 A | * | 3/1999 | Zumbe ........................ 426/481 |
| 7,641,930 B2 | * | 1/2010 | Hanselmann ................. 426/593 |
| 2004/0115326 A1 | | 6/2004 | Heinze |

FOREIGN PATENT DOCUMENTS

| | | |
|---|---|---|
| EP | 0828144 | 3/1998 |
| GB | 2015863 | 9/1979 |
| RU | 2242785 | 12/2004 |

(Continued)

OTHER PUBLICATIONS

Minifie, Bernard W., "Chocolate, Cocoa and Confectionery: Science and Technology", 1970, J. & A. Churchill, London, GB, XP002424951, pp. 20-24.

(Continued)

*Primary Examiner* — Brian J Sines
(74) *Attorney, Agent, or Firm* — Hoxie & Associates, LLC

(57) ABSTRACT

The invention relates to a computer-aided method for preparing chocolates and/or chocolate-/cocoa-flavored compositions from a bank of ingredients $P_j$ using tools such as a valuation system E which can be used to assign a numerical value $v_{ij}$ to the taste descriptor $G_i$ of each ingredient $P_j$ and a function f designating the set of rules that can be used to calculate the values $v_{ic}$ characterising the taste of a combination C of chocolates. The invention also relates to a device for performing the inventive method.

26 Claims, 3 Drawing Sheets

FOREIGN PATENT DOCUMENTS

Figure 1:
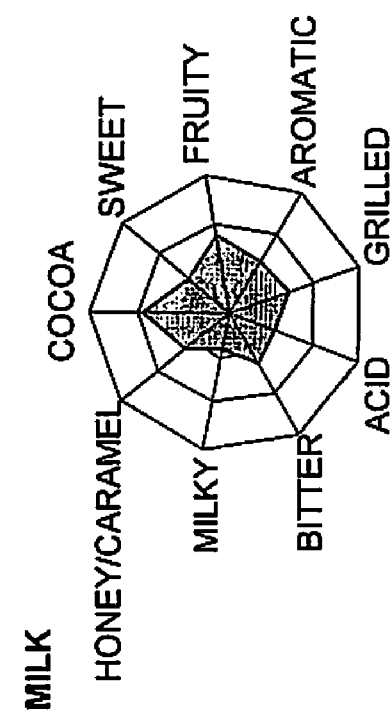
Figure 1:
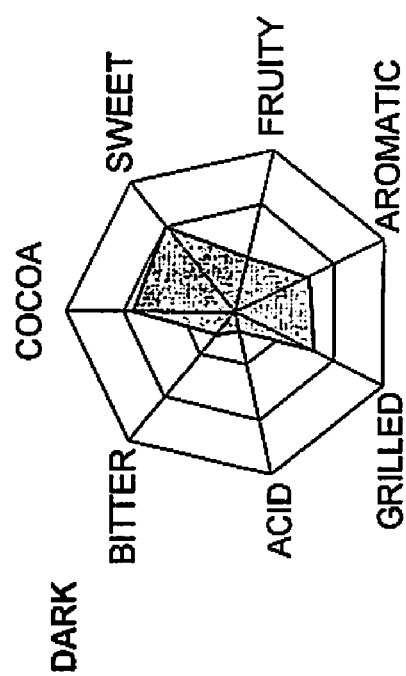

| | | |
|---|---|---|
| WO | WO03021515 | 3/2003 |
| WO | WO03096240 | 11/2003 |

OTHER PUBLICATIONS

Randebrock, Dr. Rudolf Em., "Neue Ergebnisse der beschreibenden statistischen Prüfungsmethode bei der Ermittlung der Geschmackseigenschaften von Schokoloademischungen", Deutsche Lebensmittel-Rundschau, vol. 74, No. 6, 1978, pp. 219-227, XP008076343.

Swiss Search Report for Swiss Application No. 01648/06 completed Jan. 26, 2007.

\* cited by examiner

METHOD FOR PREPARING CHOCOLATES AND/OR CHOCOLATE-/COCOA-FLAVORED COMPOSITIONS

This invention relates to a method for preparing blended chocolates or chocolate-/cocoa-flavored compositions from a bank of ingredients, the ingredients referring in particular to a chocolate or a cocoa mass. The invention also relates to a device for performing the inventive method.

Preparation of chocolates from a selection of cocoas from different origins is the everyday work of the professional chocolate maker.

Until now, this creative process was mainly empirical.

The professionals, relying on their experience and intuition, choose the chocolates or cocoa masses they want to use to prepare their new recipes. After blending said ingredients, the result is evaluated by tasting.

Perfecting a recipe considered as satisfactory is carried out after several unsuccessful blending tests and is often the fruit of chance.

The impossibility of predicting the result of a blend of chocolates and/or of masses considerably limits the options of the creators who must resort to trial and error. Due to the predominance of chance when preparing a new chocolate recipe, much time and raw materials may be wasted, since the recipe can only be validated after the final step in the creative process.

Moreover, when the creator is seeking to obtain a particular taste, no method is available to eliminate the factor of chance and obtain the expected result in a controlled manner.

In view of these difficulties, the inventors endeavored to develop a method and a device to help professionals prepare a blended chocolate, said method offering controlled evolution of the tastes during the creative process.

The invention therefore relates to a computer-aided method for preparing a recipe of a chocolate and/or chocolate-/cocoa-flavored composition from a bank of n ingredients $P_j$, the ingredients $P_j$ referring in particular to a chocolate or cocoa mass, characterized in that it comprises the following steps:

define a scale of values E to assign a numerical value to the taste descriptor $G_i$ of each ingredient $P_j$, the set of values $v_{ij}$ defining the taste profile of the ingredient $P_j$, determine a function f, such that $v_{ic}=f(k_j, v_{ij})$ f designating the set of rules used to calculate the values $v_{ic}$ characterizing the taste of a blend C of chocolates and/or cocoa masses such that $C=\Sigma(j=0 \rightarrow n) k_j P_j$, $k_j$, between 0 and 1, limits included, being a coefficient designating the proportion of ingredient $P_j$ in the blend C, choose a chocolate or cocoa mass base B, whose values $v_{ib}$ have been defined, use the function f to determine the new values of the coefficients $k_j$, $v_{ij}$ in the implementation of two alternative methods a and/or b as follows:

a. choose the new value $v_{ib}'$ of the taste descriptor $G_l$ to be modified in base B, apply a conversion step in which at least two coefficients $k_j$ are modified and calculated so that $f(k_j, v_{ij})$ reaches value $v_{ib}'$, then calculate the set of values $v_{ib}'$ of taste descriptors $G_i$, resulting from the modification of coefficients $k_j$, b. modify at least two coefficients $k_j$ of base B, then calculate the set of values $v_{ib}'$ of tastes $G_i$.

A chocolate-/cocoa-flavored composition refers in particular to an alimentary composition such as a filling, a coating, etc. including at least one ingredient made from cocoa.

"$P_j$" designates the ingredients which could be used in the composition of a blended chocolate. It concerns in particular all the ingredients which could be added during the final phase of a chocolate, in other words which do not need to undergo the various steps in the chocolate manufacturing method such as conching. It concerns in particular pure origin chocolates, blended chocolates, couverture chocolates, cocoa masses, flavored chocolates, milk chocolates, white chocolates, cocoa butter, chocolate-/cocoa-flavored compositions or additives such as aromas. In the ingredients $P_j$, the chocolates were selected to obtain the widest range of tastes possible by blending.

"n" designates the number of ingredients available to the creator to prepare the chocolate. "n" is at least equal to 2 and has no upper limit. Advantageously, between 15 and 150 ingredients can be used.

"$G_i$" designates the taste descriptors whose evolution will be monitored during the creative process. "$G_l$" identifies a specific taste descriptor $G_l$ from the taste descriptors $G_i$. Some examples of taste descriptors $G_i$ include: acid, balanced, orange, sour, bland, perfumed, acrid, floury, persistent, aggressive, iron, sharp, alkaline, fermented, plain, alcohol, delicate, apple, bitter, strong, pot-ash, harsh, fresh, praliné, aromatic, fruity, rancid, artificial, fleeting, liquorice, astringent, smoked, musty, biscuity, grease, round, burnt, greasy, salty, cocoa, grilled, sweet, coffee, milk, tobacco, caramel, concentrated, roasted, cardboard, liqueur, characteristic, chocolate, mass, cow, confectionery, medicine, vanilla, full-bodied, mint, velvety, cream, honey, young, cooked, moldy, old, mild, neutral, vinegar, spicy, hazelnut, etc. These various taste descriptors were identified by the inventors (see example 1) when creating the sensorial profiles (quantification of the chocolate flavors). A limited number must then be selected to set up a base of taste descriptors.

All the taste descriptors used may be specific to the type of chocolate to be created. In particular, various descriptors will be used when preparing dark, milk or white chocolate.

To prepare a dark chocolate, the taste descriptors $G_i$ may advantageously be selected from the group containing cocoa, bitter, sweet, acid, fruity, pot-ash, roasted, greasy, smoked, burnt, alcohol, medicine, coffee, persistent, astringent, cardboard, grilled, aromatic. They are preferably chosen from the group containing cocoa, sweet, fruity, aromatic, grilled, acid, bitter. This combination of taste descriptors $G_i$ proved in fact particularly relevant when characterizing the set of tastes of a dark chocolate. Another combination could also be as relevant, however. Since some tastes are similar, several combinations of descriptors can be used giving comparable results. For example, the "sour" flavor is also partly represented by the "fruity" and "acid" flavors. The aim is therefore to define a set of taste descriptors $G_i$ producing a relevant base to describe a given chocolate. Moreover, the number of descriptors is unlimited. A limited number is recommended, however, so that the professional can quickly become familiar with these descriptors. Advantageously, between 5 and 10 descriptors will be used.

To prepare a milk chocolate, the preferred taste descriptors $G_i$ are selected from the group containing milk, sweet, cocoa, sharp, greasy, caramel, hazelnut, vanilla, honey, biscuity, rancid, smoked, astringent, cardboard, while to prepare a white chocolate they should preferably be chosen from the group containing milk, sweet, vanilla, honey, caramel, fruity, alcohol, sharp, cooked, rancid.

In addition, the descriptors $G_i$ may also be used to characterize the mouthfeel of the chocolate. In this case, the descriptors $G_i$ can be chosen from the following group of textures: brittle, firm, soft, break, frank, delicate, unctuous, waxy, melting, pasty, sticky, crumbly, powdery, compact, granular, rough, creamy, greasy, sandy, crunchy, coarse, dry, hard, smooth, tender, thick, mellow, etc.

Advantageously, the descriptors will be chosen from the group consisting of brittle, crunchy, soft, greasy, dry, delicate, coarse, melting, sticky, unctuous and, preferably, the following group of descriptors will be used: brittle, sticky and delicate.

The value of descriptor $G_i$ in ingredient $P_j$ is represented by the rating "$v_{ij}$". This rating is also used to designate, once calculated, the value of descriptor $G_i$ in the final blended chocolate or blended chocolate during preparation, said chocolate being designated below by the letters "C" (blended chocolate in general, rating "$v_{ic}$") or "B'" (blended chocolate during preparation, rating "$v_{ib}$'").

Example 1 gives an idea of the type of rating that can be used. In this example, a rating using values from 0 to 6 is used. Another type of rating (e.g. color gradation code) and another scale (e.g. from 0 to 10) may obviously be used.

"f" designates the set of calculation rules governing the evolution of a given taste $G_i$ during blending. These rules can be grouped under a single function applicable to all descriptors. These rules can be improved, however, according to a specific descriptor. In this case, "f" will correspond to the set of functions $f_i$ governing the evolutions of tastes $G_i$ during the blended chocolate creation process.

"$k_j$" indicates the proportion of ingredient $P_j$ in the blended chocolate. The sum of the values $k_j$ is therefore equal to 1 and the values of $k_j$ are between 0 and 1, limits included. When $k_j$ is equal to 0, ingredient $P_j$ is not present in the blended chocolate. When $k_j$ is equal to 1, only ingredient $P_j$ is present in the composition. The latter case is generally only possible when starting from a base B consisting exclusively of one ingredient $P_j$.

"B" designates the base used to create the blended chocolate. This base can be chosen from the pure origin chocolates (e.g. a Tanzania pure origin chocolate) or the blended chocolates. Bases composed of a blended chocolate can be divided into two categories:

the "traditional" blended chocolates, with harmonious organoleptic properties, and the "characteristic" blended chocolates prepared so that at least one taste $G_i$ is predominant. In the rating system, this predominance results in one or more values $v_{ij}$ being above or well above the average. To create milk chocolates, it is also possible to start from "traditional" or "characteristic" blended milk chocolates. Advantageously, the milk chocolates could have a predominant caramel, milky- or cocoa-flavored taste. According to an alternative, pre-established milk chocolate bases can be created, including very little cocoa mass (between 5 and 15%) in order to choose dark chocolates in the ingredients to be added.

The advantage of characteristic bases is to guide the creator when preparing his taste. These characteristic bases are therefore particularly suited to method "a.". When creation is initiated with method "b.", it may be advantageous to use a blended chocolate base, in particular pure origin chocolates.

Example of characteristic chocolate: grilled with a slight acid note:

60% Ivory Coast chocolate,
40% Papua chocolate.

Advantageously, methods a. and b. are used separately or alternately and can be repeated until a blended chocolate C with a satisfactory taste profile is obtained.

Method a. is also referred to hereafter as the "analytical method". This method can be used to indicate the result to be reached in terms of taste $G_i$ value $v_{ij}$ and, whenever possible, one or more solutions will be proposed to reach this objective. Note that some objectives cannot be reached. In particular, depending on the ingredients $P_j$ and the taste descriptors a selected, the values $v_{ij}$ are limited. For a given taste descriptor $G_i$, the upper limit of value $v_{ij}$ will be value $v_{ij}$ of the compound $P_j$ with the highest value $v_{ij}$ and its lower limit will be value $v_{ij}$ of the compound $P_j$ with the lowest value $v_{ij}$.

Method b. is also referred to hereafter as the "empirical method". This name indicates that the creator wants to add a proportion of an ingredient in the chocolate blend and observe the effect this addition has on the set of values $v_{ij}$ of the taste descriptors G. The choice of this addition can be guided using the additional indications possibly available to the creator. Further details on these points will be given in the explanation of the device below.

During the blended chocolate creation process the creator may, as he pleases, use either of the two methods at each step of the process. He may also use only the analytical method or only the empirical method.

In practice, the creator obtains information on the taste profile (values for $v_{ij}$ all descriptors $G_i$) of the base B or of the chocolate C being prepared from the ratings $v_{ij}$ displayed via an interface installed on the computer implementing the inventive method. On this interface, the creator can use a cursor to modify any of the values $v_{ij}$ or modify the proportion ($k_j$) of at least one ingredient $P_j$.

At each step, the computer recalculates at least one taste profile and proposes it to the creator. If the creator validates a profile, the recipe of the chocolate created is given (set or values $k_j$ of compounds $P_j$).

Advantageously, the conversion step of method a. can be performed as follows:

when $v_{ib}'>f(k_j, v_{ij})$, choose from the ingredients $P_j$ of value $v_{ij}>v_{ib}'$ at least one ingredient $P_{sel+}$ and calculate the value(s) $k_{sel+}$ of the ingredient(s) $P_{sel+}$ to be introduced in the base B in order to reach the value $v_{ib}'$, then the value(s) $k_{sel+}$ having been determined and at least one value $k_j$ modified, in which $j \neq sel+$, now calculate if necessary the set of new values $v_{ib}'$ for the other tastes $G_i$, thereby defining the new taste profile of the chocolate B' obtained, when $v_{ib}'<f(k_j, v_{ij})$, choose amongst the ingredients $P_j$ of value $v_{ij}<v_{ib}'$ at least one ingredient $P_{sel-}$ and calculate the value(s) $k_{sel-}$ of the ingredient(s) $P_{sel-}$ to be introduced in the base B in order to reach the value $v_{ib}'$, then the value(s) $k_{sel-}$ having been determined and at least one value $k_j$ modified, in which $j \neq sel-$, now calculate if necessary the set of new values $v_{ib}'$ for the other tastes $G_i$, thereby defining the new taste profile of the chocolate B' obtained.

If $v_{ib}'<f(k_i, v_{ij})$, preferably at least one ingredient $P_{sel-}$ can be chosen for which $k_{sel-}$ is not equal to 0, which amounts to modifying the proportion of an ingredient already present in the preparation.

The inventors have also established a linear scale E of values $v_{ij}$, whose origin is zero when the taste $G_i$ is absent. In this rating system, the inventors have identified a function f such that $v_{ic} = \Sigma(j=0 \rightarrow n) k_i v_{ij} / \Sigma(j=0 \rightarrow n) k_j$. This function f can be applied to all the descriptors with satisfactory results. This function f was in fact determined by a panel of trained and experienced testers. This function can also be improved through the use of a set of functions $f_i$ as indicated above.

According to one embodiment, during the conversion step, write $P_j^{sup}$ the ingredients $P_j$ of value $V_{ij}>V_{ib}'$, increase one or more of the coefficients $k_j$ of the ingredients $P_j^{sup}$ by a value $\epsilon$, choose amongst the ingredients $P_j$ for which $k_j \neq 0$, those of value $v_{ij}<v_{ib}'$ which are written $p_j^{inf}$, reduce one or more of the coefficients $k_j$ of the ingredients $p_j^{inf}$ by a value $\epsilon$, such that the sum of the coefficients $k_j$ remains equal to 1 then repeat q times until $|v_{lb}'-f(k_j, v_{ij})|<\delta$.

Similarly, write $P_j^{inf}$ the ingredients $P_j$ of value $V_{ij}<V_{lb}'$, increase one or more of the coefficients $k_j$ of the ingredients $P_j^{inf}$ by a value $\epsilon$, choose amongst the ingredients $P_j$ for which $k_j \neq 0$, those of value $v_{ij}>v_{lb}'$ which are written $p_j^{sup}$, reduce one or more of the coefficients $k_j$ of the ingredients $p_j^{sup}$ by a value $\epsilon$, such that the sum of the coefficients $k_j$ remains equal to 1 then repeat q times until $|v_{lb}'-f(k_j, v_{ij})|<\delta$.

The ingredients $P_j^{sup}$, respectively $P_j^{inf}$, are advantageously chosen from the ingredients with the largest values $v_{ij}$, respectively the lowest values $v_{ij}$.

To reach the desired result, it is possible to choose one or more $P_j^{sup}$, respectively one or more $P_j^{inf}$.

During the conversion step, ingredients other than those already present can be used. It is in fact possible to use $P_j^{sup}$ and $P_j^{inf}$ for which $k_j=0$ (new ingredients are then introduced in the blended chocolate being prepared) and/or $P_j^{sup}$ and $P_j^{inf}$ for which $k_j \neq 0$ (in this case, the ingredients already present in the blended chocolate being prepared are modified).

If a unique $P_j^{sup}$, respectively $P_j^{inf}$ is used, the method employed can be repeated with a different $P_j^{sup}$, respectively $P_j^{inf}$, in order to propose several solutions for a given value $v_{lb}'$.

While the first solution calculated provides a way of reaching the value $v_{lb}'$, the effect on the other tastes may in fact be too great. When several solutions are available, the solution which has the least impact on the tastes which are not to be modified can be chosen.

Preferably, if $v_{lb}'>f(k_j, v_{ij})$, choose a unique $P_j^{sup}$ and one or more $p_j^{inf}$. In addition, the $P_j^{sup}$ can be chosen advantageously from all the chocolates in the ingredient bank, irrespective of the value of $k_j$, in other words either a new ingredient is introduced in the composition, or the proportion of an ingredient already present is increased, if said ingredient has one of the maximum values for the descriptor $G_i$ to be modified.

Similarly, if $v_{lb}'<f(k_j, v_{ij})$, preferably choose a unique $P_j^{sup}$ for which $k_j \neq 0$ and $p_j^{inf}$: select the ingredient present at the time of the modification which has the highest rating in the taste descriptor concerned and, preferably, reduce its proportion and increase that of at least one other ingredient which has the lowest rating on this descriptor, already present in the composition (in the latter case, also choose the value(s) $P_j^{inf}$ such that $k_j \neq 0$). This procedure avoids diluting all the tastes.

Limiting the number of $P_j^{sup}$ and/or $P_j^{inf}$ used reduces the calculation time. The calculation step must not prevail over the blended chocolate creation steps. On the contrary, it may be advantageous to use several $P_j^{sup}$ and/or $P_j^{inf}$ values to avoid changing the tastes $G_i$ too much apart from the taste $G_I$ which is being deliberately modified.

$\delta$ represents the constraint, i.e. the maximum difference with respect to the objective to be reached. A high value of $\delta$ will produce a chocolate whose taste may be quite different from the objective set. Conversely, if the value of $\delta$ is too small, the objective may never be reached and the calculation times will be increased considerably. Preferably therefore, a $\delta$ of substantially the same order of magnitude as the rating accuracy will be used. In the examples below, the rating is based on a decimal scale from 0 to 6, to the nearest 0.1. In these examples therefore, $\delta$ may lie in the interval ]0; 0.5], preferably 5 is equal to 0.1.

The coefficient $\epsilon$ represents the increment used for the iterations used in the analytical method.

If a low value of $\epsilon$ is used, a low value of $\delta$ can also be used. If the value of 6 is too high with respect to the value of $\delta$, there is a risk that the condition $|v_{lb}'-f(k_j, v_{ij})|<\delta$ is never met. Note that reducing the value of $\epsilon$ increases the number of iterations and increases the calculation time required. Preferably therefore, the value of $\epsilon$ used will lie in the interval ]0; 1]. In the following examples, $\epsilon$ is equal to 0.01.

The ingredients $P_j$ may include several categories of ingredients, in particular two categories: ingredients derived from chocolates $P_{choc}$ and ingredients derived from cocoa masses $P_{mass}$.

Note in fact that the values $v_{ij}$ of the cocoa masses $P_{mass}$ may be higher (see example 1). If due to the physical properties of the cocoa masses and their workability it is difficult or even impossible to produce a chocolate blend exclusively from masses, we observe in this case that adding masses provides a means of reaching values $v_{lb}'$ which could not be reached by using chocolates only.

Initially, it is possible to use only ingredients $P_{choc}$ in method a. and ingredients $P_{choc}$ and $P_{mass}$ in method b.

Secondly, in method a., when the desired value $v_{lb}'$ cannot be reached by increasing or decreasing the proportion $k_j$ of an ingredient $P_j^{sup}$ or $P_j^{inf}$, an ingredient $P_{mass}$ can be introduced. Advantageously, the $P_{mass}$ corresponding to the $P_{choc}$ will be introduced. For example, the Ivory Coast pure origin cocoa mass can be introduced when the desired value $v_{lb}'$ cannot be reached by modifying the proportion of Ivory Coast pure origin chocolate. Advantageously, an ingredient $P_{mass}$ can be added to the ingredient $P_{choc}$. In this case, the proportion of another ingredient $P_j$ different from $P_{choc}$, for which $kj \neq 0$, is then reduced to introduce the $P_{mass}$ corresponding to $P_{choc}$.

In addition, when creating milk chocolates, it may be advantageous to increase the milky or honey/caramel taste by adding white chocolate. Similarly, adding caramel milk chocolate increases the caramel taste.

The ingredients $P_j$ may include a third category, called additives, in the form of flavored chocolates, aromas, chocolate-flavored compositions. We may mention caramel milk chocolate for example. The tastes $G_i$ are also used to quantify the intensity of the additional aromas.

In this case, the aromas may be extracts, zests, fruits, spices such as walnuts, grated or not, essential oils. More especially, they may be chosen from the group containing vanilla, caramel, strawberry, banana, red fruits, apple, ginger, lavender, lemon, orange, cinnamon, coffee, pear, salt, pepper, pink berries, hazelnut, almond, walnut, thyme, alcohols, etc.

In addition, once the recipe has been validated, food colors can be added. This is especially advantageous when preparing a white chocolate.

The invention also relates to a device especially adapted for the implementation of the method described above.

It is a device for the preparation of chocolate and/or chocolate-/cocoa-flavored composition from a bank of ingredients, characterized in that it comprises a space including visual taste assessment means and a set of calculation rules implemented by computer, said rules being used to determine the evolution of these visual means during the chocolate and/or composition preparation process.

Preferably, the bank of ingredients will be composed of the ingredients $P_j$ described previously.

There may be different types of visual taste assessment means. Visual means such as a representation of the tastes are mainly used. This representation may be displayed in figures or colored. According to an advantageous embodiment, these visual means include a rating $v_{ij}$ of the taste descriptors $G_i$ on a scale E as described in the method above.

These visual means may also include a map of all the cacao tree plantations correlated with the rating $v_{ij}$ of the taste descriptors $G_i$ characterizing the tastes of the pure origin chocolates from these plantations. This type of display allows the creator to correlate the organoleptic characteristics with the geographic location of the plantations. In particular, this guides him with the choice of his ingredients during the preparation of the blended chocolate when using the empirical method.

In addition, all these visual means are combined with gustative means to correlate the visual means with the gustative means, so that any description using the visual means of a chocolate, whether pure origin or blended, is combined with a possibility of tasting. Tasting a certain number of chocolates will advantageously represent a step prior to the preparation of a blended chocolate using the inventive method. This step allows the creator to become familiar with the visual means such as the rating $v_{ij}$ of the taste descriptors $G_i$, used during the creation process, for example by associating the variations of a taste $G_i$ felt during tasting with the rating $v_{ij}$ proposed.

The set of calculation rules preferably consists of the function f described previously. In addition, these calculation rules will advantageously be implemented using the inventive method.

Lastly, the device according to the invention also includes an application space to prepare and taste the blended chocolate created. The device and the method according to the invention are only creation aids. The creator will always have the last word by validating or not his recipe during this step.

Figure 2:
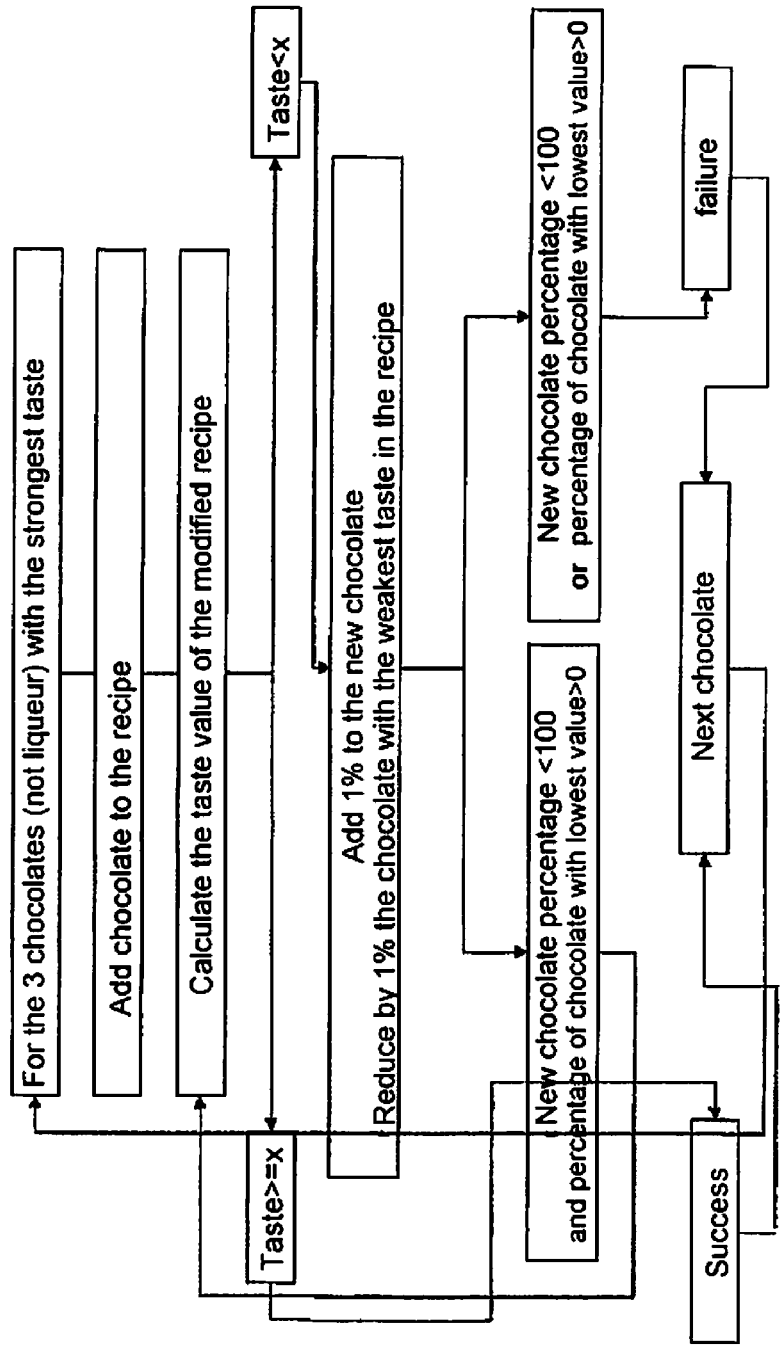
Figure 3:
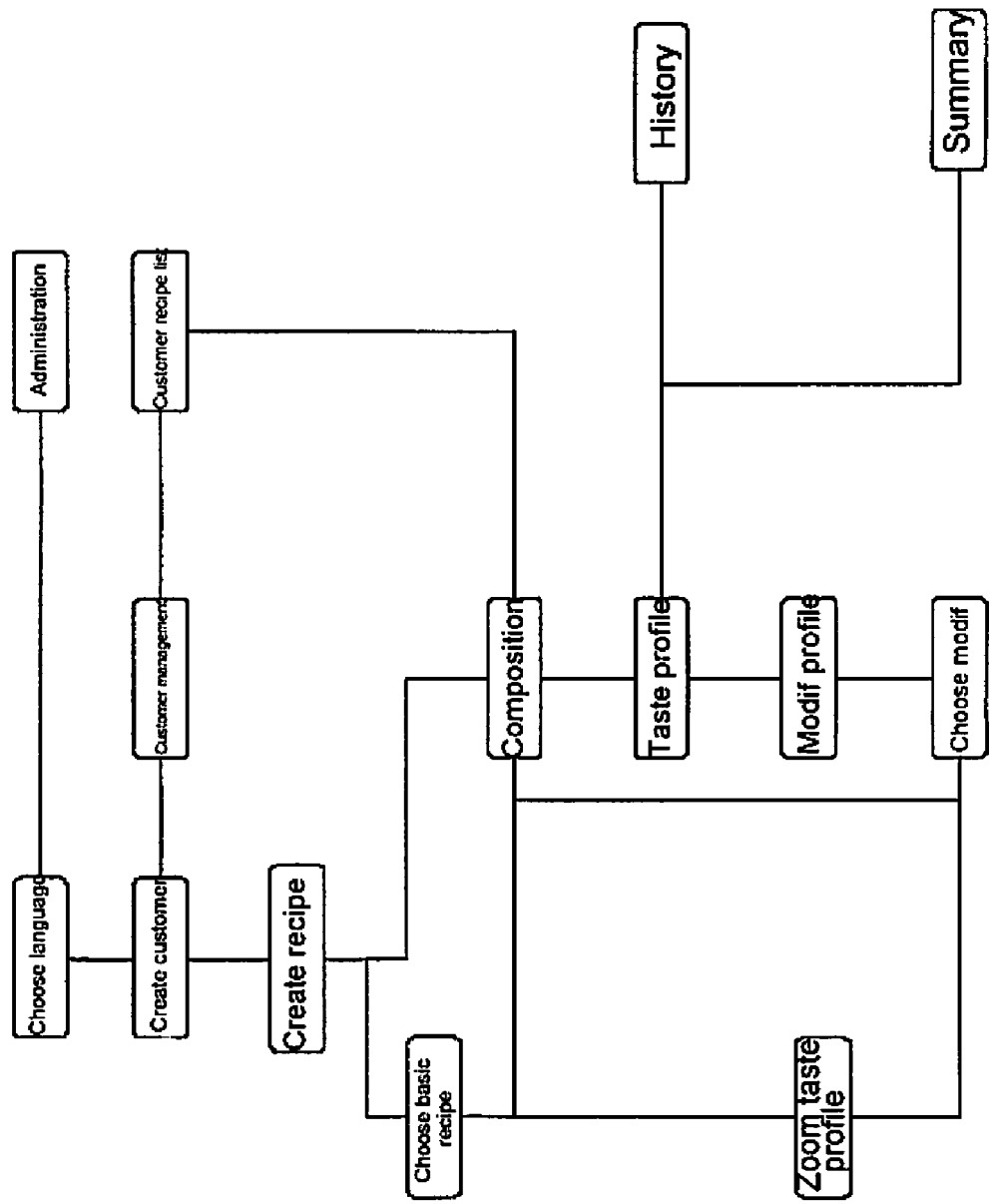

It will be easier to understand the invention on reading the following description referring to the drawings, on which:

FIG. 1 is a graphic representation of the values of the tastes of a chocolate, said tastes being used as base for implementation of the inventive method, FIG. 2 represents the algorithm for chocolate preparation according to the invention, FIG. 3, which proposes the various software interaction steps.

Examples of recipes and applications of the inventive method are given below.

EXAMPLE 1

Determination of the Values $v_i$ of the Taste Descriptors $G_i$

Table I below includes a list of chocolates, tasted by a panel of testers trained according to Afnor standard NF 29-021 May 1990.

This standard was used as a basis by the inventors to select from an exhaustive list the taste descriptors considered as most relevant for classification and tasting of the chocolates.

It was also used as a basis when defining and establishing a rating for each taste descriptor $G_i$ and training the testers.

For example, for each taste descriptor $G_i$, the testers had to taste chocolates with the strongest or the weakest taste in order to determine the taste extremes, then by dichotomy to familiarize them with the variations of the different tastes.

The taste descriptors to be determined and rated are chosen from: acid, balanced, orange, sour, bland, perfumed, acrid, floury, persistent, aggressive, iron, sharp, alkaline, fermented, plain, alcohol, delicate, apple, bitter, strong, pot-ash, harsh, fresh, praline, aromatic, fruity, rancid, artificial, fleeting, liquorice, astringent, smoked, musty, biscuity, grease, round, burnt, greasy, salty, cocoa, grilled, sweet, coffee, milk, tobacco, caramel, concentrated, roasted, cardboard, liqueur, characteristic, chocolate, mass, cow, confectionery, medicine, vanilla, full-bodied, mint, velvety, cream, honey, young, cooked, moldy, old, mild, neutral, vinegar, spicy, hazelnut, brittle, firm, soft, break, frank, delicate, unctuous, waxy, melting, pasty, sticky, crumbly, powdery, compact, granular, rough, creamy, greasy, sandy, crunchy, coarse, dry, hard, smooth, tender, thick, mellow.

In the remaining examples, the following descriptors will be used:
- for a dark chocolate: cacao, sweet, fruity, aromatic, grilled, acid, bitter,
- for a milk chocolate: milk, sweet, cocoa, sharp, greasy, caramel, hazelnut, vanilla, honey, biscuity, rancid, smoked, astringent, cardboard, and
- for a white chocolate: milk, sweet, vanilla, honey, caramel, fruity, alcohol, sharp, cooked, rancid.

TABLE I

|  | COCOA | SWEET | FRUITY | AROMATIC | GRILLED | ACID | BITTER |
|---|---|---|---|---|---|---|---|
| CUBA 70% | 3.9 | 2.6 | 2.3 | 2.8 | 1.4 | 1.1 | 2.6 |
| TANZANIA 75% | 4.1 | 2.1 | 3.6 | 3.6 | 1.5 | 2.7 | 2.7 |
| SANTO DOMINGO 70% | 3.6 | 1.7 | 1.7 | 2.4 | 1.4 | 1.3 | 2.7 |
| SAO TOME 72% | 4.5 | 1.1 | 1.2 | 2.3 | 2.9 | 3.5 | 4.3 |

The chocolates listed in the above table form a sample of the compounds $P_j$ which could be used by the inventive method to prepare a dark chocolate.

This table gives a scale of values E used to assign a numerical value $v_{ij}$ to a taste $G_i$. These values were determined according to the above-mentioned standard by a panel of trained testers, the value being calculated as an average of the ratings assigned by each tester.

In this case, the descriptors $G_i$ are chosen as being: cocoa, sweet, fruity, aromatic, grilled, acid, bitter.

The value is assigned on a scale from 0 to 6.

For a Tanzania chocolate, for example, the value $v_{ij}$ of the fruity taste was rated 3.6 by the panel of testers.

In this case, the number of descriptors $G_i$, which correspond to the tastes considered as the strongest and common to all compounds $P_j$, is deliberately limited to 7 to simplify preparation of the chocolate by the creator.

This table can also be used to draw up a corresponding table II for the pure masses, i.e. the result of grinding the beans before incorporating sugar. For example, a Cuba 70% chocolate corresponds to a Cuba pure mass to which 30% sugar has been added.

TABLE II

|  | COCOA | SWEET | FRUITY | AROMATIC | GRILLED | ACID | BITTER |
|---|---|---|---|---|---|---|---|
| CUBA 100% | 5.1. | 0.0 | 2.9 | 3.6 | 1.9 | 1.5 | 3.4 |
| SANTO DOMINGO 100% | 4.6 | 0.0 | 2.2 | 3.2 | 1.9 | 1.7 | 3.5 |
| TANZANIA 100% | 5.1 | 0.0 | 4.5 | 4.5 | 1.8 | 3.4 | 3.3 |
| MEXICO 100% | 5.0 | 0.0 | 4.6 | 3.4 | 3.6 | 2.8 | 3.4 |

Unlike the chocolates, the cocoa masses were not rated by a panel of testers. The inventors demonstrated that from the chocolate version, the quantity of sugar added reduced all the values of the ratings other than sugar by the same amount. Inversely, to rate a pure mass, an index equivalent to the percentage difference of cocoa between the chocolate-flavored version and the 100% version is applied to each attribute. The sugar rating is then obviously reduced to 0. This correlation was then validated by the panel of testers.

For a Tanzania 75% chocolate, for example, the fruity taste descriptor is 3.6. For the Tanzania 100% therefore, the fruity descriptor is equal to 3.6×1.25=4.5.

For a milk chocolate, the tastes will preferably be chosen from the following nine: sweet, cocoa, milk, fruity, honey/caramel, bitter, aromatic, acid, grilled.

EXAMPLE 2

Implementation of the Empirical Method

The inventors also demonstrated that from the taste values of several chocolates, a correlation could be determined for a mixture of them. It is therefore possible, using the taste values of the mixture components, to plan the taste values of a chocolate obtained by mixing the basic products listed in one of the tables.

For example, for the following mixture:
40% Cuba chocolate,
45% São Tomé chocolate, and,
15% Mexico 100% mass.

The following values are obtained by calculating the weighted sum of the value of each descriptor:

Cocoa 4.3; sweet 1.5; fruity 2.1; aromatic 2.7; grilled 2.4, acid 2.5; bitter 3.5.

As an example, the aromatic value is calculated as follows:

$$0.4 \times 2.8 + 0.45 \times 2.3 + 0.15 \times 3.4 = 2.665 \text{ rounded to } 2.7.$$

Once again, this weighted relation between the values of the initial components and those of the mixture was extrapolated from the results of the panel of testers, then revalidated by said panel.

From these 7 (or 9 for a milk chocolate) values determined or calculated, a graphical representation (or taste profile) can be produced, which is representative of the taste of each chocolate, base or mixture (FIG. 1).

It is therefore possible to draw up a map on a planisphere representing all cacao tree plantations corresponding to the various pure origin cocoas produced on various parts of the globe and assign them the corresponding graphical representation.

We might therefore expect that chocolates of equivalent geographical origin would have common characteristics and may have a substantially similar graphical representation.

For example: A user may wish to add to his recipe 25% Ecuador chocolate, instead of 10% Cuba chocolate and 15% São Tomé chocolate.

Consequently, by varying according to this empirical method a component of a chocolate mixture whose taste values are known, the taste variations in the mixture can be anticipated.

EXAMPLE 3

Implementation of the Analytical Method

Using the values listed in the tables, it is also possible, via a suitable algorithm (FIG. 2), to prepare a chocolate for which a specific value has previously been selected for one or more of the given taste descriptors.

From a base or when preparing a recipe, the creator sets the value to be reached for a given descriptor.

If the value to be reached is greater than the current value, the 3 chocolates with the strongest rating for this descriptor are determined amongst those available in the bank.

Each of the 3 chocolates is then added separately to the recipe in order to obtain a value approximately equal to the value to be reached and the taste values of the modified recipes are recalculated. The creator therefore obtains three possible recipes and can choose the recipe closest to the required taste.

If the value to be reached is less than the current value, the chocolate with the strongest rating for this descriptor is determined from the chocolates present in the composition. The proportion of this chocolate is then reduced and those of the other chocolates present in the mixture increased. We are now left with a single recipe proposal.

If the percentage of the new chocolate(s) proves to be greater than 100 or if the percentage of the chocolate(s) removed becomes less than 0, there is no solution for the search.

Quantities of pure mass can be added to dope a taste, but this addition may cause rheology problems when manufacturing a chocolate.

Obviously, the above description is not limited to dark chocolates alone, but can also be applied to the preparation of milk chocolate or white chocolate recipes.

EXAMPLE 4

Computer-Aided Implementation

Using the set of data collected and calibrated and the algorithm described above, the inventors developed a computer-aided recipe preparation method.

A suitable room equipped with a computer and software reproducing the various steps of the algorithm is provided to a chocolate maker.

Implementation of the software includes the following steps (see FIG. 3):
1. Choose language
2. Create customer
3. Create new recipe
4. Choose basic recipe The 6 basic recipes available for this type of chocolate (dark or milk) are listed. Each basic recipe is defined by a name and the display of its taste profile (Spider map). Clicking on the microscope zooms in on the taste profile (no modifications are possible). Otherwise, the initial recipe composition is chosen by clicking on the recipe. The "empirical method" can also be chosen: creation of a base by a blend chosen by the creator.

5. Composition

The user can add chocolates or cocoa masses on this screen. As soon as his composition reaches 100%, he can see the taste profile of his recipe. Each modification is logged.

6. Taste profile

The taste profile is a representation of the calculated values of each taste descriptor in the recipe, displayed on a polygon. A request may be made to modify a taste descriptor or the recipe validated.

7. Log

The log is used to review all the modifications stored and return to the state before one of these modifications.

8. Print and summary

Print: The creator can click on Print at any time during preparation of the recipe. The computer converts the blend into a recipe based on a total volume of 500 g (modifiable), so that the creator can produce this blend and taste it.

Summary: If the user decides to validate his recipe, a summary of his recipe is displayed and a certificate can be printed. The recipe will not be recalculated and no further modifications can be made.

9. Change profile

The user changes the intensity of a taste descriptor (increase or decrease) with a cursor. If the modification is validated, the software proposes from 1 to 3 recipes corresponding to the value determined on the chosen descriptor.

10. Customer management

11. Customer recipe list

Used to display the list of recipes for the current customer. By selecting a recipe in the list, it can be modified (access to its composition), if it has not been validated, or deleted. If a recipe has already been validated, the user can copy it, display the summary and print a certificate.

Algorithm to propose a recipe after changing a profile (FIG. 2)

Decreasing Descriptor Intensity

Only one recipe is proposed: choose from the chocolates already present in the recipe the one with the lowest value for the targeted taste descriptor and the one with the highest value. Decrease the proportion of the one with the highest value by 1%, increase that of the chocolate with the lowest value by 1%, and estimate whether the desired value has been reached. Otherwise, start again.

Increasing Descriptor Intensity 3 recipes are proposed: from all the chocolates in the bank, add to the recipe the chocolate with the highest value for the targeted taste descriptor and decrease the proportion of the chocolate already present in the recipe which has the lowest value for said descriptor. This increase/decrease is carried out in steps of 1% and incrementation stops as soon as the required value is obtained.

The required value is considered as having been reached when the difference between the required value and the calculated value seems acceptable.

Obviously, special additional flavors such as red fruit, vanilla tastes, etc. can be added to the recipes defined.

EXAMPLE 5

Steps Involved in a Chocolate Creation Session in the Inventive Device: the Laboratory Bases The creation process starts with tasting predefined, extremely "characterized" blends in order to guide the creator: the bases. This phase is not restricting.

These bases were prepared in order to present taste profiles offering the most discriminating/dominant taste descriptors of the chocolate.

Examples of Bases

| Dark Chocolate Bases | | Milk Chocolate Bases | |
|---|---|---|---|
| Base | Composite attributes | Base | Composite attributes |
| No. 1 | Bitter&Fruity | No. 1 | Slightly milky |
| No. 2 | Grilled&Bitter | No. 2 | Moderately milky |
| No. 3 | Fruity&Acid | No. 3 | Highly milky |
| No. 4 | Acid&Bitter | No. 4 | Slightly milky&caramel |
| No. 5 | Fruity&Grilled | No. 5 | Moderately milky&caramel |
| No. 6 | Grilled&Acid | No. 6 | Highly milky&caramel |

Choice of Base and Formalization

The customer is in the theoretical creation section of the laboratory.

He tastes the bases in order to choose the starting base for his recipe. He can also choose a pure origin chocolate or prepare his own recipe empirically, which will form his starting base.

After choosing the base, his blend and taste profile are displayed on the touch screen in the laboratory.

From base to brief . . .

The brief is the desire to change the recipe at a time T.

This change results from:

The desire to add a given proportion of a particular ingredient (empirical method), using information provided on said ingredient:

Gustative information: each component is available for tasting, on display racks.

Written information: each display rack shows the taste profile of the component, additional information on the other taste characteristics, the chocolate composition (% of cocoa and cocoa butter) and the predominant variety of cocoa beans used.

Visual information: a large planisphere shows the various cocoa producing countries with, for the origin countries of the pure origin chocolates, a precise indication of the cacao tree plantations in order to appreciate the various geographic and climatic factors which may influence the characteristic taste of the cocoa.

The desire to know the blends which could be used to determine the value of a particular taste descriptor (analytical method):

For a dark chocolate recipe, the values of all the taste descriptors can be deliberately changed by the creator.

For a milk chocolate recipe, however, the values of the "Milky" and "Honey/Caramel" tastes cannot be deliberately changed if the blend ingredients are dark chocolates and cocoa masses. These ingredients, in fact, do not have "Milky" and "Honey/Caramel" values. These values are then determined once and for all by the milky base selected.

From brief to translation . . .

The translation is the result of executing the brief. It takes into account the change to the blend recipe and the update of the taste profile.

This formalization is carried out on the touch screen. Once completed, a new brief can be given and a new translation will take place.

Empirical method: the brief is entered in the software program and the taste profile automatically updated Analytical method: 3 steps On the taste profile, select the taste descriptor whose value the creator wants to determine.

The translation is then the proposal of 3 different blends, if possible, allowing all 3 to reach the required value of the descriptor, but with different ingredients. The other taste is descriptors will change differently depending on the ingredient and the proposed proportion to be added/removed. The 3 proposals have the updated taste profile of the new blend.

The creator chooses one of the 3 proposals and the taste profile is updated accordingly. The creator can also decide to refuse these proposals.

From translation to blending . . .

After translating the various briefs, the creator prints his blend recipe. The proportions of each ingredient in the recipe are converted into weights, to produce 1 kg of recipe.

In the application section of the laboratory, the creator uses a chocolate organ to dose his blending recipe to within the nearest gram. The organ dispenses the components in their required proportions as small pellets.

The creator collects the weighed components in a bowl.

The bowl is placed in an incubator which will melt the pellets. After mixing, the blend is ready.

The creator can then taste the fruit of his creation. If he is not satisfied, he returns to the laboratory creation section to modify his recipe, from the point where he had stopped.

If he is satisfied, he will use this chocolate to make chocolate products and/or cakes, using the equipment available.

If he is fully satisfied, he validates the recipe. At this stage, the recipe can no longer be modified by anyone and will be reserved exclusively for the creator from the first manufacture, for example for a duration stipulated in his manufacturing contract.

The invention claimed is:

1. Computer method for preparation of a recipe of a chocolate and/or chocolate-/cocoa-flavored composition from a bank of n ingredients $P_j$, the ingredients $P_j$ referring in particular to a chocolate or cocoa mass, characterized in that it comprises the following steps in computer software:

define a scale of values E to assign a numerical value $v_{ij}$ for the taste descriptor $G_i$ of each ingredient $P_j$, the set of values $v_{ij}$ defining the taste profile of the ingredient $P_j$, determine a function f, such that $v_{ic}=f(k_j, v_{ij})$ f designating the set of rules used to calculate the values $v_{ic}$ characterizing the taste of a blend C of chocolates and/or cocoa masses such that $C=\Sigma(j=0\to n) k_j P_j$, $k_j$, between 0 and 1, limits included, being a coefficient designating the proportion of ingredient $P_j$ in the blend C, choose a chocolate or cocoa mass base B, whose values $v_{ib}$ have been defined, use the function f to determine the new values of the coefficients $k_j$, $v_{ij}$ in the implementation of two alternative methods a and/or b as follows:

a. choose the new value $v_{ib}'$ of the taste descriptor $G_i$ to be modified in base B, apply a conversion step in which at least two coefficients $k_j$ are modified and calculated so that $f(k_j, v_{ij})$ reaches value $v_{ib}'$, then calculate the set of values $v_{ib}'$ of taste descriptors $G_i$, resulting from the modification of coefficients $k_j$, b. modify at least two coefficients $k_j$ of base B then calculate the set of values $v_{ib}'$ of taste descriptors $G_i$.

2. Method according to claim 1, characterized in that methods a and b are used separately or alternately and can be repeated until a blended chocolate C with a satisfactory taste profile is obtained.

3. Method according to claim 1, characterized in that the conversion step of method a. is performed as follows:

when $v_{ib}'>f(k_j, v_{ij})$, choose amongst the ingredients $P_j$ of value $v_{ij}>v_{ib}'$ at least one ingredient $P_{sel+}$ and calculate the value(s) $k_{sel+}$ of the ingredient(s) $P_{sel+}$ to be introduced in the base B in order to reach the value $v_{ib}'$, then the value(s) $k_{sel+}$ having been determined and at least one value $k_j$ modified, in which $j \neq sel+$, now calculate if necessary the set of new values $v_{ib}'$ for the other taste descriptors $G_i$, thereby defining the new taste profile of the chocolate B' obtained, when $v_{ib}'<f(k_j, v_{ij})$, choose amongst the ingredients $P_j$ of value $v_{ij}<v_{ib}'$ at least one ingredient $P_{sel-}$ and calculate the value(s) $k_{sel-}$ of the ingredient(s) $P_{sel-}$ to be introduced in the base B in order to reach the value $v_{ib}'$, then the value(s) $k_{sel-}$ having been determined and at least one value $k_j$ modified, in which $j \neq sel-$, now calculate if necessary the set of new values $v_{ib}'$ for the other tastes $G_i$, thereby defining the new taste profile of the chocolate B' obtained.

4. Method according to claim 1, characterized in that the scale of values E is linear and has its origin at value 0 for which the taste $G_i$ is absent and in that function f is such that $v_{ic}=\Sigma(j=0\to n) k_j v_{ij}/\Sigma(j=0\to n)k_j$.

5. Method according to claim 3, characterized in that during the conversion step, write $P_j^{sup}$ the ingredients $P_j$ of value $V_{ij}>V_{ib}'$, increase one or more of the coefficients $k_j$ of the ingredients $P_j^{sup}$ by a value $\epsilon$, choose amongst the ingredients $P_j$ for which $k_j \neq 0$, those of value $v_{ij}<v_{ib}'$ which are written $p_j^{inf}$, reduce one or more of the coefficients $k_j$ of the ingredients $p_j^{inf}$ by a value $\epsilon$, such that the sum of the coefficients $k_j$ remains equal to 1 then repeat q times until $|v_{ib}'-f(k_j, v_{ij})|<\delta$.

6. Method according to claim 3, characterized in that during the conversion step, write $P_j^{inf}$ the ingredients $P_j$ of value $V_{ij}<V_{ib}'$, increase one or more of the coefficients $k_j$ of the ingredients $P_j^{inf}$ by a value $\epsilon$, choose amongst the ingredients $P_j$ for which $k_j \neq 0$, those of value $v_{ij}>v_{ib}'$ which are written $p_j^{sup}$, reduce one or more of the coefficients $k_j$ of the ingredients $p_j^{sup}$ by a value $\epsilon$, such that the sum of the coefficients $k_j$ remains equal to 1 then repeat q times until $|v_{ib}'-f(k_j, v_{ij})|<\delta$.

7. Method according to claim 5, characterized in that, for a decimal rating, $\delta$ lies in the interval $]0; 0.5]$.

8. Method according to claim 5, characterized in that a unique $P_j^{sup}$ is chosen.

9. Method according to claim 5, characterized in that a unique $P_j^{inf}$ is chosen.

10. Method according to claim 8, characterized in that the method used is repeated with a different $P_j^{sup}$ in order to propose several solutions for a given value $v_{ib}'$.

11. Method according to claim 9, characterized in that the method used is repeated with a different $P_j^{inf}$ order to propose several solutions for a given value $v_{ib}'$.

12. Method according to claim 1, characterized in that $\epsilon$ lies in the interval $]0; 1]$.

13. Method according to claim 1, characterized in that during the conversion step if $v_{lb}'>f(k_j, v_{ij})$, then a $P_j^{sup}$ is chosen for which $k_j=$or $\neq 0$ and if $v_{lb}'<f(k_j, v_{ij})$ then a $P_j^{sup}$ is chosen for which $k_j\neq 0$.

14. Method according to claim 1, characterized in that to prepare a dark chocolate, the taste descriptors $G_i$ are chosen from the group containing cocoa, bitter, sweet, acid, fruity, pot-ash, roasted, greasy, smoked, burnt, alcohol, medicine, coffee, persistent, astringent, cardboard, grilled, aromatic.

15. Method according to claim 1, characterized in that to prepare a milk chocolate, the descriptors $G_i$ are chosen from the group containing milk, sweet, cocoa, sharp, greasy, caramel, hazelnut, vanilla, honey, biscuity, rancid, smoked, astringent, cardboard.

16. Method according to claim 1, characterized in that to prepare a white chocolate, the descriptors $G_i$ are chosen from the group containing milk, sweet, vanilla, honey, caramel, fruity, alcohol, sharp, cooked, rancid.

17. Method according to claim 14, characterized in that the descriptors $G_i$ are chosen from the group containing cocoa, sweet, fruity, aromatic, grilled, acid, bitter.

18. Method according to claim 1, characterized in that the descriptors $G_i$ are also used to characterize the chocolate texture.

19. Method according to claim 18, characterized in that the descriptors $G_i$ are chosen from the group containing brittle, crunchy, soft, greasy, dry, delicate, coarse, melting, sticky, unctuous.

20. Method according to claim 1, characterized in that the ingredients $P_j$ comprise two categories, the ingredients derived from chocolates $P_{choc}$ and the ingredients derived from cocoa masses $P_{mass}$.

21. Method according to claim 20, characterized in that initially, it is possible to use only ingredients $P_{choc}$ in method a. and ingredients $P_{choc}$ and $P_{mass}$ in method b.

22. Method according to claim 5 or 21, characterized in that secondly, in method a., when the desired value $v_{lb}'$ cannot be reached by increasing or decreasing the proportion $k_j$ of an ingredient $p_j^{sup}$ or $p_j^{inf}$, an ingredient $P_{mass}$ can be added to ingredient $P_{choc}$.

23. Method according to claim 20, characterized in that the ingredients $P_j$ include a third category, called additives, in the form of flavored chocolates, chocolate-flavored compositions or aromas, and in that the descriptors $G_i$ are also used to quantify the intensity of the additional aromas.

24. Method according to claim 23, characterized in that the aromas are chosen from the group containing vanilla, caramel, strawberry, ginger, lemon, orange, cinnamon, coffee.

25. Method according to claim 1, characterized in that the base is chosen from the group containing: pure origin chocolates, blended chocolates.

26. Method according to claim 1, characterized in that the bases B based on blended chocolate include characteristic blended chocolates prepared so that at least one taste $G_i$ is predominant.

* * * * *

UNITED STATES PATENT AND TRADEMARK OFFICE
CERTIFICATE OF CORRECTION

| | | |
|---|---|---|
| PATENT NO. | : 8,357,418 B2 | Page 1 of 1 |
| APPLICATION NO. | : 12/439741 | |
| DATED | : January 22, 2013 | |
| INVENTOR(S) | : Bouvier et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

Signed and Sealed this
Third Day of March, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,357,418 B2  Page 1 of 1
APPLICATION NO. : 12/439741
DATED : January 22, 2013
INVENTOR(S) : Bouvier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

First Day of September, 2015

Michelle K. Lee
*Director of the United States Patent and Trademark Office*